(12) United States Patent
Dreizler et al.

(10) Patent No.: US 9,360,210 B2
(45) Date of Patent: Jun. 7, 2016

(54) COMBUSTION METHOD WITH COOL FLAME BASE

(75) Inventors: Ulrich Dreizler, Hausen ob Verena (DE); Daniel Dreizler, Balgheim (DE)

(73) Assignee: Ulrich Dreizler, Hausen ob Verena (DE)

( * ) Notice: Subject to any disclaimer, the term of this patent is extended or adjusted under 35 U.S.C. 154(b) by 401 days.

(21) Appl. No.: 13/885,458

(22) PCT Filed: Aug. 23, 2011

(86) PCT No.: PCT/DE2011/001633
§ 371 (c)(1),
(2), (4) Date: May 22, 2013

(87) PCT Pub. No.: WO2012/065582
PCT Pub. Date: May 24, 2012

(65) Prior Publication Data
US 2013/0280662 A1    Oct. 24, 2013

(30) Foreign Application Priority Data
Nov. 16, 2010    (DE) .......................... 10 2010 051 414

(51) Int. Cl.
*F23D 14/14*    (2006.01)
*F23C 99/00*    (2006.01)
*F23D 14/02*    (2006.01)
*F23D 14/58*    (2006.01)

(52) U.S. Cl.
CPC .............. *F23D 14/14* (2013.01); *F23C 99/008* (2013.01); *F23D 14/02* (2013.01); *F23D 14/58* (2013.01); *F23C 2203/20* (2013.01); *F23D 2203/105* (2013.01); *F23D 2210/00* (2013.01); *F23D 2212/201* (2013.01)

(58) Field of Classification Search
CPC ............ F23D 14/125; F23D 2212/103; F23D 2212/201
USPC ........................................... 431/329
See application file for complete search history.

(56) References Cited

U.S. PATENT DOCUMENTS

| | | | | | |
|---|---|---|---|---|---|
| 1,731,053 | A | * | 10/1929 | Lowe | 431/328 |
| 1,901,086 | A | * | 3/1933 | Cox | 239/523 |
| 3,170,504 | A | * | 2/1965 | Lanning | 431/328 |
| 3,251,396 | A | * | 5/1966 | Nitsche | 431/328 |
| 3,258,058 | A | * | 6/1966 | L Herault et al. | 431/329 |
| 3,291,188 | A | * | 12/1966 | Partiot | 431/328 |
| 3,472,601 | A | | 10/1969 | Yamamura et al. | |
| 3,561,902 | A | * | 2/1971 | Best | 31/328 |

(Continued)

FOREIGN PATENT DOCUMENTS

| | | |
|---|---|---|
| CA | 2117605 | 9/1993 |
| DE | 90 05 033 | 7/1990 |

(Continued)

OTHER PUBLICATIONS

Inagaki et al., JP 06094224 A, Apr. 1994—English Abstract.*

(Continued)

*Primary Examiner* — Jorge Pereiro
(74) *Attorney, Agent, or Firm* — Collard & Roe, P.C.

(57) ABSTRACT

A combustion method of a mixture composed of air and fuel uses a precious metal fiber membrane (1), wherein additional openings (3) for generation of a flame field with higher flames (8) are provided, the roots (7) of which are kept cool for NOx reduction, among other things.

7 Claims, 4 Drawing Sheets

(56) References Cited

U.S. PATENT DOCUMENTS

| | | | | |
|---|---|---|---|---|
| 3,661,499 | A * | 5/1972 | Krieger | 431/328 |
| 3,683,058 | A * | 8/1972 | Partiot et al. | 264/156 |
| 3,847,534 | A * | 11/1974 | Nomaguchi et al. | 431/329 |
| 3,912,443 | A * | 10/1975 | Ravault et al. | 431/328 |
| 3,954,387 | A * | 5/1976 | Cooper | 431/328 |
| 4,063,873 | A * | 12/1977 | Naito | 431/328 |
| 4,340,357 | A * | 7/1982 | Kito et al. | 431/328 |
| 4,504,218 | A * | 3/1985 | Mihara et al. | 431/326 |
| 4,608,012 | A * | 8/1986 | Cooper | 431/328 |
| 4,673,349 | A * | 6/1987 | Abe et al. | 431/328 |
| 4,888,234 | A * | 12/1989 | Smith et al. | 442/371 |
| 4,919,609 | A * | 4/1990 | Sarkisian et al. | 431/7 |
| 5,104,309 | A * | 4/1992 | Krieger | 431/7 |
| 5,137,583 | A * | 8/1992 | Parent et al. | 136/253 |
| 5,161,965 | A * | 11/1992 | Nakamura | 431/328 |
| 5,205,731 | A * | 4/1993 | Reuther et al. | 431/328 |
| 5,224,856 | A * | 7/1993 | Nakamura | 431/328 |
| 5,356,487 | A * | 10/1994 | Goldstein et al. | 136/253 |
| 5,360,490 | A * | 11/1994 | Nelson | 136/253 |
| 5,375,998 | A * | 12/1994 | Witteveen | 431/328 |
| 5,409,375 | A * | 4/1995 | Butcher | 431/328 |
| 5,441,402 | A * | 8/1995 | Reuther et al. | 431/7 |
| 5,447,666 | A * | 9/1995 | LaFontaine | 264/628 |
| 5,496,171 | A | 3/1996 | Ozawa et al. | |
| 5,993,200 | A * | 11/1999 | Palmer-Jones | 431/328 |
| 6,000,930 | A * | 12/1999 | Kelly et al. | 431/7 |
| 6,092,622 | A * | 7/2000 | Hiers et al. | 181/290 |
| 6,190,162 | B1 * | 2/2001 | Smith et al. | 431/328 |
| 6,428,312 | B1 | 8/2002 | Smelcer et al. | |
| 8,887,863 | B2 * | 11/2014 | Okabe et al. | 181/256 |
| 2003/0134247 | A1 * | 7/2003 | Dewaegheneire | 431/326 |
| 2004/0132607 | A1 * | 7/2004 | Wood et al. | 501/95.1 |
| 2009/0272600 | A1 * | 11/2009 | Okabe et al. | 181/227 |
| 2009/0274924 | A1 * | 11/2009 | Pelzer et al. | 428/596 |
| 2011/0111356 | A1 * | 5/2011 | Claerbout et al. | 431/329 |

FOREIGN PATENT DOCUMENTS

| | | | |
|---|---|---|---|
| DE | 91 07 108 | 8/1991 | |
| DE | 198 47 042 | 4/2000 | |
| EP | 0 549 476 | 6/1993 | |
| EP | 0 628 146 | 12/1994 | |
| JP | 06094224 A * | 4/1994 | F23D 14/16 |
| JP | H0694224 A | 4/1994 | |
| JP | 09-170725 | 6/1997 | |
| JP | 09229314 A * | 9/1997 | F23D 14/16 |
| JP | H09229314 A | 9/1997 | |
| JP | 2000055316 A * | 2/2000 | F23D 14/16 |
| WO | WO 93/18342 | 9/1993 | |
| WO | WO 01/86204 | 11/2001 | |

OTHER PUBLICATIONS

Hiromoto et al., JP 09229314 A, Sep. 1997—English Abstract.*
Iseda, JP 2000055316 A, Feb. 2000—English Abstract.*
Erfahrungsberichte from "Gaswaerme International (59) No. May 2010 Schiefe Kesselmusik . . . ".
International Search Report of PCT/DE2011/001633, date of mailing Sep. 14, 2012.
International Preliminary Report on Patentability of PCT/DE2011/001633, May 16, 2013.

* cited by examiner

II  Curve at λ = 1.4 with smooth punched or lasered orifices

Figure 3:
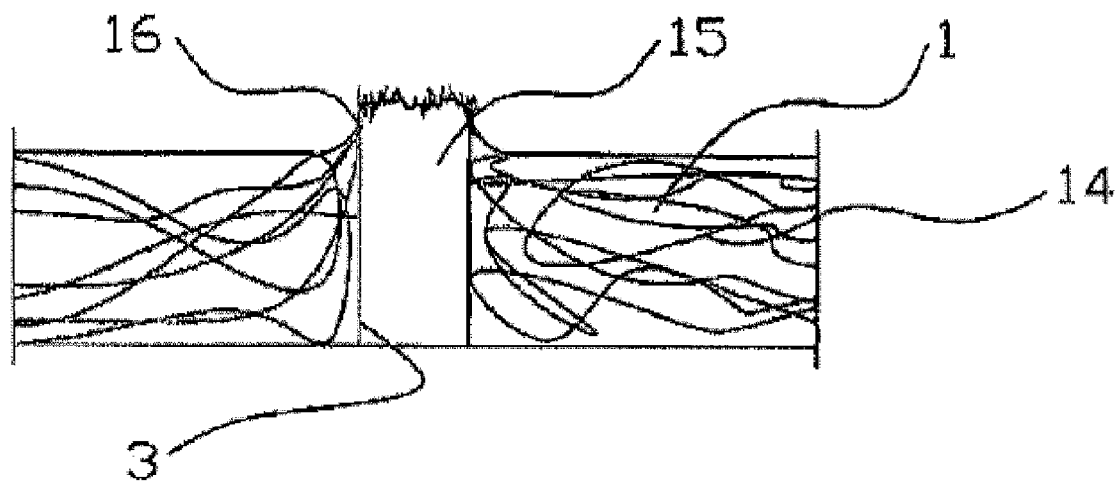
Figure 4:
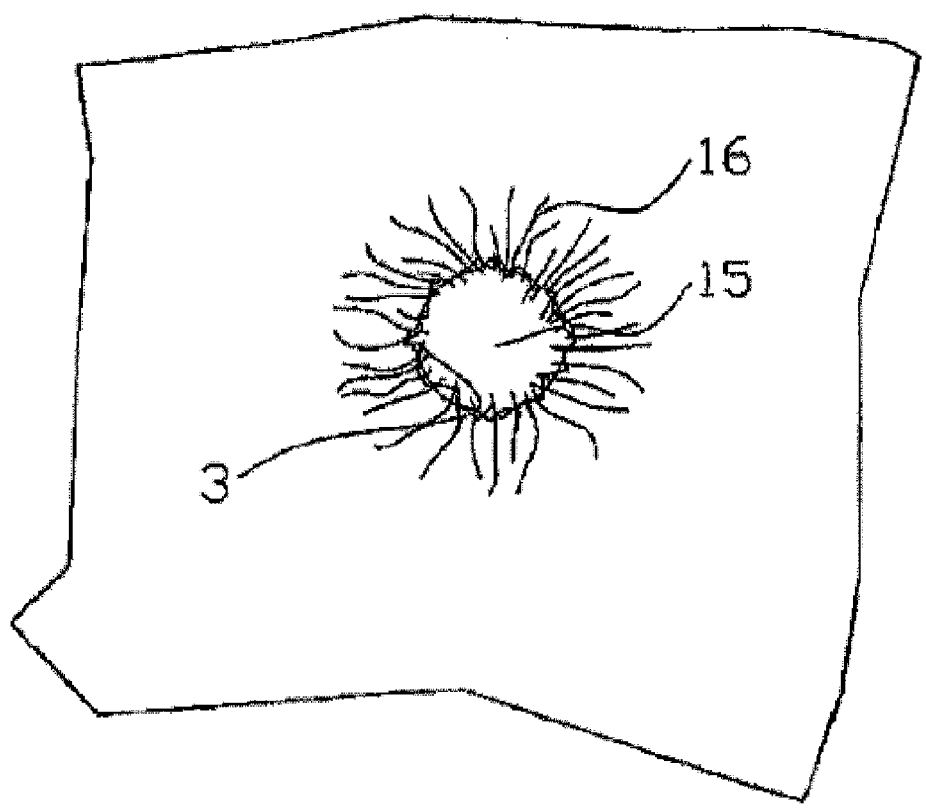

III  Curve at λ = 1.4 with orifices having the special configuration of Fig. 3 and 4

COMBUSTION METHOD WITH COOL FLAME BASE

CROSS REFERENCE TO RELATED APPLICATIONS

This application is the National Stage of PCT/DE2011/001633 filed on Aug. 23, 2011, which claims priority under 35 U.S.C. §119 of German Application No. 10 2010 051 414.4 filed on Nov. 16, 2010, the disclosure of which is incorporated by reference. The international application under PCT article 21(2) was not published in English.

STATE OF THE ART

The invention proceeds from a method for complete combustion of a homogeneous mixture of air and fuel (gas and/or oil) in accordance with the species of the main claim.

Figure 2:
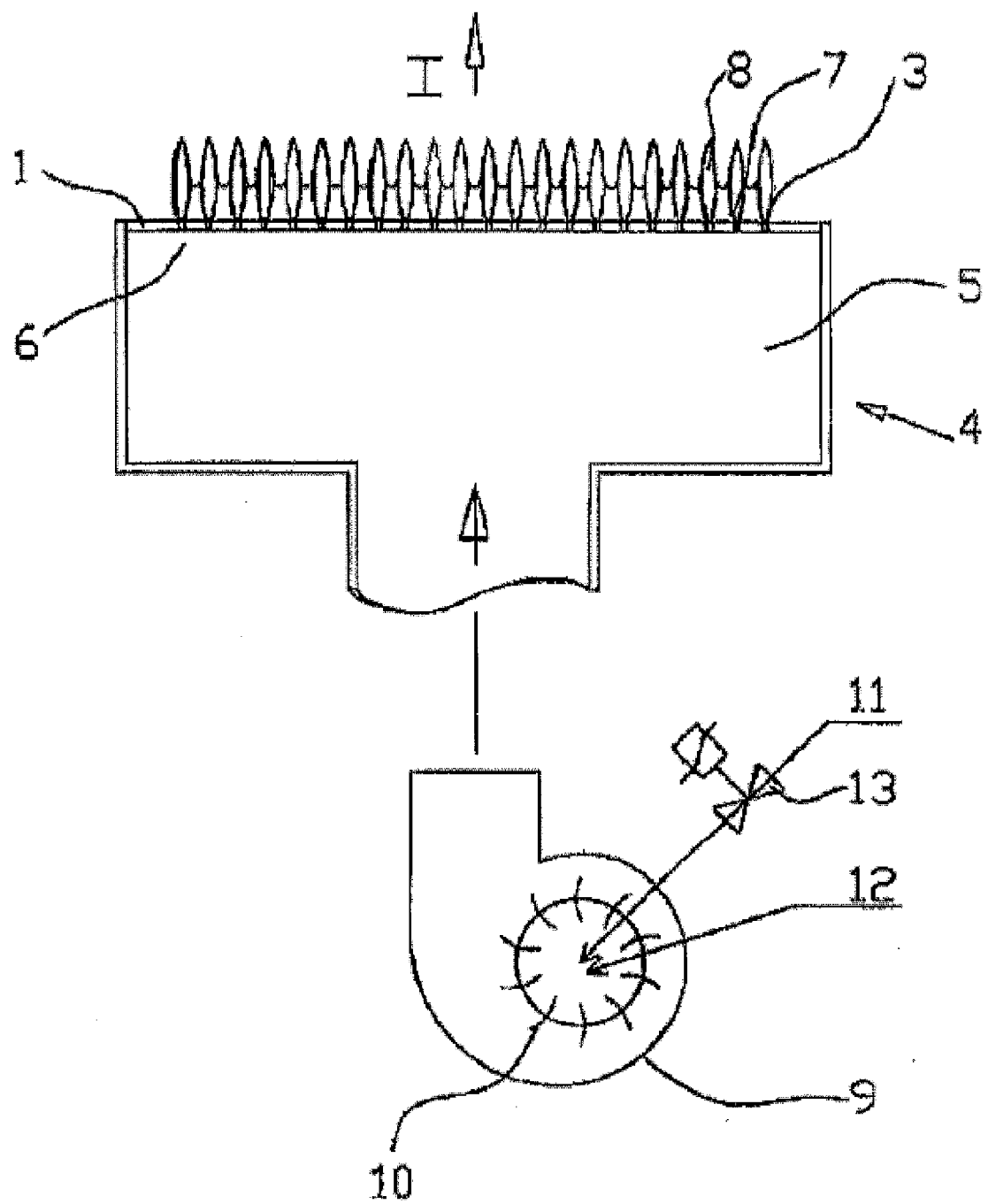

From the European patent EP 0 628 146 B1, it is known to perform a combustion method by means of a woven fabric membrane, in which the flame field with higher flames that occurs on the membrane during combustion on the basis of the additional openings is brought about by means of a regular pattern of these transverse holes, which take up a passage surface area of the membrane of 5-35% of the entire surface of the membrane, whereby the aforementioned transverse holes (additional openings) are produced by means of punch pins that penetrate the membrane (claim 1, lines 12 and 13). As shown in FIG. 2 of the patent, these transverse punched holes can be configured in funnel shape, section by section, whereby it can be assumed that the transverse holes are produced from the funnel side, in other words from the subsequent inlet side, by means of the punching tool. Such a punching tool demands a matrix that has a corresponding separating effect for the cutting effect, the hole diameter of which matrix is only slightly greater than the outside diameter of the punch pins, which correspondingly leads to a smooth cut edge of the transverse hole orifice. According to the document, a uniform transverse gas stream with a corresponding combustion process is achieved over the entire metal fiber plate, by means of this regular arrangement of a specific passage of transverse holes, so that in use, no unilateral overload or overheating of the membrane takes place, and thereby the power range can be increased despite achieving low NOx emissions, all of this with "low risk of the occurrence of resonances in the gas stream" (p. 2 and 3). However, the advantages mentioned there involve problems that have not been solved until now, as can be derived from claims 17 to 19, which claim an extra layer for noise insulation. In any case, the reduction of the risk of occurrence of resonances is seen in use with the regular pattern of the transverse holes, and, of course, also their cross-section. Last but not least, this known membrane is also supposed to be suitable for blue-flame burners, in order to thereby create low CO and NOx emissions. In any case, the problems of a method for complete combustion of a homogeneous mixture of air and fuel can be derived from this European patent. This particularly holds true for the temperature configuration of the higher flames, whereby because of the vague description in the patent, namely that the flame field with higher flames that occurs during combustion is brought about by means of a regular pattern of these transverse holes, this probably is supposed to mean that the higher flames have approximately the same flame temperature, in each instance, whereby, however, only so much is said about the low flames that these could also be blue flames. The statements on page 7 regarding the "resonance phenomena" also proceed from the assumption that a very high top side, in other words the combustion side of the membrane, is involved, and this in turn substantiates the statements relating to use of the membrane for radiation burners, so that such membranes must be classified with a different species than the combustion method according to the invention.

In a scientific article in "Erfahrungsberichte {Experience Reports}" from "GASWÄRME {GAS HEAT} International [59], page 383," the problem of this noise development, particularly also in the case of condensing boilers, is discussed. For example, it is pointed out there that "a condensing boiler" can "produce noises of unimagined volume." Whereby aside from the problem of thermal acoustics, clean combustion and a broad modulation range with maximal utilization of the combustion heat are desired. For example, it can certainly be required that different power ranges have to be operated with a membrane, without the NOx values impermissibly rising as a result, or "out-of-tune boiler music" being produced. The scientist who wrote the article points out that "the amplifier properties of the flame can be influenced by means of variation of the flame holder, in other words the burner. One of the parameters, for example, is the different outflow velocity through the burner, which is directly connected with the burner geometry. The complicated problem of the relationship between the flame and the rest of the condensing boiler was already researched many times at various Dutch and international universities. Nevertheless, no clear formation rules are available as yet. The development of a guaranteed noise-free (low-noise) condensing boiler prototype, which furthermore also meets the requirements concerning the degree of effectiveness and emissions value, is therefore still music of the future. In this regard, much research work is still required."

Nothing more probably needs to be added here regarding the importance or the problems, and therefore also regarding the task on which the invention is based.

The attempt to increase the power range of a burner with surface combustion also during operation, with observation of the flame lifting phenomenon, with a remaining low toxic component (NOx) in the waste gas, and with otherwise advantageous combustion, can be derived from the European Patent EP 0 549 476 B1. However, the proposal shown there can hardly be implemented in practice, because the central-symmetrical arrangement of the passage openings having different diameters, in each instance, is extremely difficult to produce, aside from the fact that with the object described there, lifting off of the flame is primarily supposed to be prevented. In any case, an increase in the power range of such a symmetrically perforated membrane is not aimed at, nor is a reduction in NOx, quite aside from the reduction or prevention of a combustion noise.

The latter would actually probably increase on the basis of the claimed arrangement of the passage holes relative to one another.

The woven fabric membranes that are mentioned in the species of the patent application and are part of the state of the art serve for complete combustion of the premixed fuel/air mixture on their exit side. The fuel/air mixture is ignited, after having flowed through the membrane, on the surface of the latter that serves as the combustion side, and kept stable there as a flame. If the power is increased, and thereby the velocity of the passage of the fuel/air mixture is increased, the flame can lift off, with the risk of a dangerous unintentional exit of non-combusted gases into the combustion chamber of a boiler, with the corresponding risk of explosion.

The Invention with Task and Advantages

The invention is based on the task of further developing the method of the stated species. This task is accomplished, according to the invention, by means of the features described herein.

When the method is carried out using the burner membrane, a separate flame field with higher flames having a separate flame root exists as the result of the additional openings in the membrane. This characteristic is known as such in many instances. In the case of the invention, however, the flame root is already relatively cool, because of the fuel/air mixture that flows in from behind, whereby the cooling is reinforced by means of the configuration of the orifices of these additional openings. The decisive factor is that the flame root of these higher flames does not exert any direct heat radiation onto the membrane. Furthermore, because of the special configuration of the orifices of the additional openings, cooling on the basis of the expansion effect is achieved at the orifices after the fuel/air mixture has passed through. This cooling leads to a reduction in the toxic component (NOx) in the waste gas and to prevention of the amplification of vibration noises of combustion. Furthermore, because of the additional arrangement of the openings in the membrane, tearing-off of the flames is also prevented. An additional advantage is that a fuel/air mixture can flow through the membrane at greater speed and in a greater amount, whereby the remaining woven fabric membrane parts bring about slower penetration of the fuel/air mixture and therefore good re-ignition and flame holding. The additional openings primarily serve for allowing unhindered passage of different, also changing fuel/air amounts, in order to thereby prevent tearing-off or lifting-off of the flame, even in the case of a load change.

These characteristics, which are decisive for complete combustion of a homogeneous mixture of air and fuel, and also include the waste gas and the power loss resulting from vibration noises, are underestimated, as the state of the art shows, and have not been accomplished within the scope of the underlying task, up to the present. For example, the characteristic of achieving cooling of the flame root of the larger flames is of extraordinary importance. For example, in the prior art, hot surfaces of the membranes are discussed for using radiation heat, as well. This particularly occurs in the case of low surface stresses in the smaller power range, whereas in the case of greater power, the flame becomes blue and no glowing surfaces can be seen any longer. In the case of the invention, however, the surface glows at certain points, at the orifices, even at greater power, by means of keeping the flame root cool, and conducts the heat from the flame roots away by way of the membrane surface, and this flame root is kept cool. Because of this chilling and nevertheless proper functioning of the combustibility of a fuel/air mixture, the permissible power range of the membrane, which was originally adjusted, in other words when first put into use, to the lowest possible proportion of NOx, in other words optimal λ, is greatly increased, of course.

Last but not least, the configuration of the orifice of these additional openings has an extremely great influence on the possible vibration noises of combustion, which can be completely prevented, depending on the configuration. The characteristic that a configuration of the orifice of these additional openings can lead to prevention of the amplification of vibration noises of combustion is new, in any case, and already represents an invention in itself. Up to the present, persons skilled in the art tried without results to find the causes of these changes in vibration noise, in order to base prevention on them. Damping membranes, specific hole configurations, etc., were used, without really achieving any success, and without thereby increasing the permissible power range and thereby reducing the toxic component (NOx) or avoiding other disadvantages.

According to an advantageous embodiment of the inventive method, the additional openings are configured, actually in known manner, as passage holes that connect the two sides of the membrane(s), whereby their orifices, which project into the combustion chamber, form the flame root, thereby achieving cooling of the flame root, as described above. Such cooling can possibly take place also with other means, but the decisive factor for the invention is that it takes place. It is true that in the state of the art, the matter of concern is also mastering high temperatures on the membrane, but not the influence of a cool flame root on the entire combustion process, as it is claimed for the characteristics of the invention.

According to an advantageous embodiment of the method, the flow of fuel/air mixture for generation of the planar low flame field is achieved in known manner, on the basis of the porosity of the fiber fabric, whereby according to the invention, the additional openings for generation of a separate flame field with flames having cool flame roots are claimed not only in flat membranes, but also in domed or tubular membranes. The decisive factor is the cool flame root for achieving a broad power range, with the NOx component in the waste gas remaining in the permissible range when this range is changed, and that vibration noises that occur during combustion are not amplified.

According to an advantageous embodiment of the invention, resonance vibrations that occur because of the configuration of the orifices of the additional openings are immediately reduced when they occur, by means of acoustical de-tuning, or they cannot even occur in the first place. Of course, this presupposes that the flame root is cool. An advantageous configuration of the orifices of the additional openings disposed in the membrane yields the result that these passage holes run essentially perpendicular to the surface of the membrane and are produced by means of displacement of membrane fabric. As a result, the orifices can be configured in the most varied ways.

DRAWING

An exemplary embodiment of the object of the invention is shown in the drawing and will be described in greater detail below.

Figure 1:
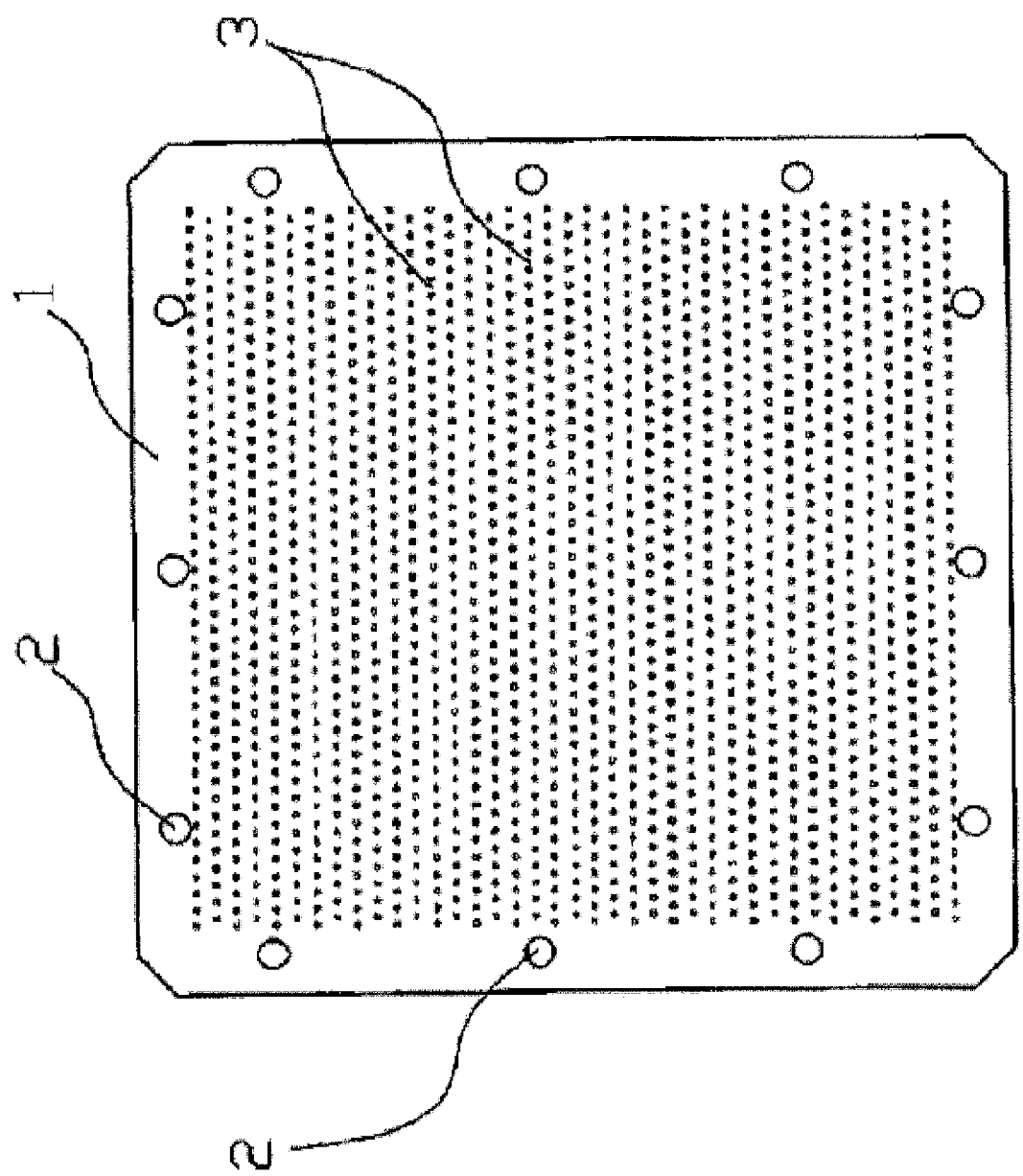

The figures show:

FIG. 1 a membrane in a top view;

FIG. 2 a section through a burner head and, on a reduced scale, the related burner blower;

FIG. 3+4 the membrane on an enlarged scale, with orifice configuration; and

Figure 5:
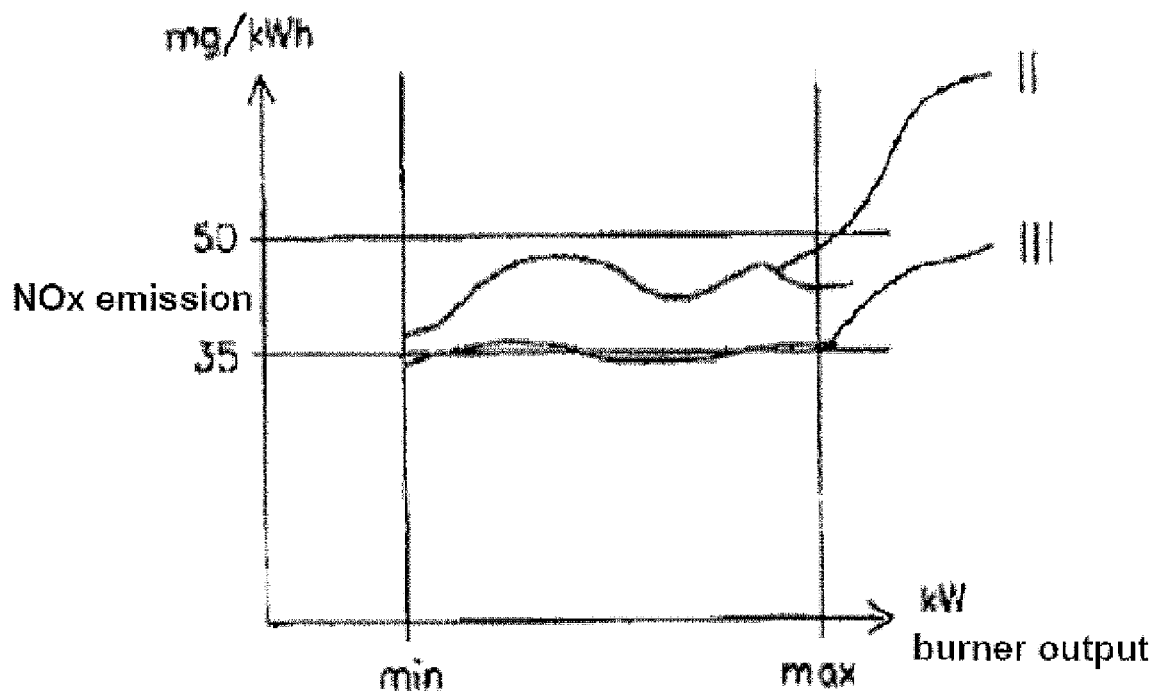

FIG. 5 a diagram with NOx over kW of the inventive method.

DESCRIPTION OF THE EXEMPLARY EMBODIMENT

In FIG. 1, a membrane is shown in a top view; it consists, in known manner, of heat-resistant, in other words refractory woven fabric composed of inorganic fibers. At the edge of this membrane 1, holes 2 are arranged, with which the membrane is fastened to hold it when a homogeneous mixture of air and fuel flows through it. In the membrane, in the woven fabric, a great number of additional openings 3 are provided, by way of which the fuel/air mixture can penetrate more easily than through the woven fabric, so that in accordance with these additional openings 3, an additional flame field with higher flames occurs than those flames that are formed on the woven fabric as a low flame field. In FIG. 1, the membrane is shown configured as a level panel. However, it can also be configured to be domed or tubular, so that accordingly, the fuel/air mixture is supplied on one side of the curvature, while the flame fields are present on the side facing away from the curvature.

In the burner head 4 shown in FIG. 2, a burner frame 5 for the membrane 1 is shown, by way of which the fuel/air mixture is supplied to the membrane 1, and in which a flame flash-back barrier 6 (not shown in any detail) is disposed upstream from the membrane 1, i.e. a heat-resistant metal sheet with bores that allow the combustion mixture to pass through. After having flowed through this flame flash-back barrier 6, the fuel mixture flows through the membrane 1 and openings 3 (referred to in the claims as additional openings), whereby cooling or chilling of the flame roots 7 of these additional flames 8 shown in FIG. 2 is achieved by means of tear-off edges at the orifices of these openings 3, shown in FIG. 3. Between these additional flames 8, but without heating the flame roots 7 of the additional flames 8, a flame field of low flames is present, which is formed by the fuel/air portion that flows over the woven fabric.

Upstream from the burner head 4 is the feed of the fuel/air mixture, with a blower 9, a fan wheel 10, a fuel feed line 11, and an air feed line 12. A solenoid valve 13 is disposed in the fuel feed line 11. While noises that develop in the blower 9 in known combustion methods, or on the membrane 1 during combustion, by way of resonances, sometimes becoming almost intolerable, in the invention, this is prevented by means of the configuration of the openings, by means of de-tuning of the vibrations in the openings. In any case, it is a prerequisite that the flame root 7 is kept cool, and that the orifices of the openings 3 have a configuration according to which they face in the firing direction I. This can be a combustion chamber of a boiler, for example.

In FIG. 3 and FIG. 4, the configuration of such an additional opening is shown. The membrane 1, which consists of woven fabric 14 consisting of stainless steel, is perforated by means of a mandrel 15, so that the orifices 16 are frayed. It is surprising to a person skilled in the art that this effect, namely the configuration of the orifice of the openings 3 in the direction I of the firing, prevents resonance formation of noises that occur by means of an apparatus or during combustion.

These particular advantages can be derived from FIG. 5, in which a great working range without any combustion disadvantage can be achieved for an optimum, namely a stoichiometric mixture of fuel and air with $\lambda=1.4$.

In the diagram shown in FIG. 5, the NOx emission is represented in mg/kWh above the hypotenuse, and the burner power in kW is shown above the abscissa. It is characteristic for such a membrane that at a stoichiometric mixture of $\lambda=1.4$ that is normally aimed at, and with openings 3 having a smoothly punched or lasered output edge, the NOx emission changes in non-determinable manner, even at a change in the burner power, as shown in Curve II. It is different for the Curve III for a structured orifice 16 of the additional opening 3 having frayed parts that projects into the combustion chamber. The NOx component is very clearly lower here, with surprising prevention of noise amplifications.

All of the characteristics presented in the specification, the claims below, and shown in the drawing can be essential to the invention not only individually but also in any desired combination with one another.

REFERENCE SYMBOL LIST

1 membrane
2 holes
3 openings
    higher flame field with holes 3
    lower flame field on woven fabric
4 burner head
5 burner frame
6 flame flash-back barrier
7 flame root
8 additional flames
9 blower
10 fan wheel
11 fuel feed line
12 air feed line
13 solenoid valve
14 woven fabric
15 mandrel
16 orifice
I firing direction
II smooth orifice
III frayed orifice

The invention claimed is:
1. Burner membrane comprising
   at least two metal woven fabric layers consisting only of stainless steel and present one of top of the other,
   wherein the at least two metal woven fiber layers are sintered to one another,
   wherein the burner membrane has an entry side for a fuel/air mixture and has a combustion side, the entry side facing away from the combustion side,
   wherein the combustion side is an exit side, is configured so that combustion takes place directly on the combustion side, is configured to take part in flame ignition and stabilization of a flame, and is configured to face a combustion chamber,
   wherein the burner membrane has additional openings for passage of additional fuel/air mixture,
   wherein each respective orifice of the additional openings has an irregular configuration projecting beyond the exit side of the burner membrane,
   wherein the additional openings are configured as passage holes that connect the entry side and the exit side of the burner membrane,
   wherein each orifice is configured to hold a respective flame root of a higher separate flame, and
   wherein the irregular configuration of the orifices takes place via a fiber material displacement by producing the additional openings and comprises frayings of an edge of the orifices.

2. Method for complete combustion of a homogeneous mixture of air and fuel,
   via a woven fabric membrane composed of inorganic precious metal fibers disposed upstream from a combustion side and downstream from a device that serves for feed of the fuel/air mixture, and is permeable for the mixture,
   having an entry side of the woven fabric membrane for the fuel/air mixture on the membrane side facing away from the combustion side of the membrane,
   having an exit side of the membrane, facing away from the entry side of the latter, forming the combustion side, on which combustion takes place directly, and which takes part in flame ignition and stabilization thereof,
   with generation of a planar or curved low flame field via the fuel/air mixture on the exit side of the woven fabric of the membrane, and
   having additional openings in the membrane for additional fuel/air mixture passage and for generation of a flame field having higher separate flames having separate flame roots, wherein the flame roots of the higher flames are kept cool in that the orifices of the additional openings of the membrane have an irregular special configuration, wherein the orifices furthermore project beyond the exit side of the woven fabric, for achievement of cooling of the flame root of the higher flames, wherein the additional openings are configured as passage holes that connect the two sides of the membrane, whose orifices, forming the flame root, project out of the openings, in each instance, on the exit side of the woven fabric into the combustion chamber, forming their orifices, and wherein the orifice configuration occurs by modification of the woven fabric in the form of fraying of the orifice edge.

3. Method according to claim 2, wherein the flow of the fuel/air mixture for generation of the planar low flame field is achieved on the basis of the porosity of the fiber fabric, and wherein the additional openings for generation of a separate flame field with flames having cool flame roots occur, not only in flat membranes but also in domed or tubular membranes.

4. Method according to claim 2, wherein because of the cooling of the flame root, the NOx component in the waste gas is greatly reduced, all the way down to a theoretical minimal value.

5. Method according to claim 2, wherein as a result of the cold flame root, the combustion power stress on the membrane exit side that can be achieved can be more than doubled as compared with known burners, and can be adapted to the power demand.

6. Method according to claim 2, wherein because of the configuration of the orifices of the additional openings, resonance vibrations are immediately reduced when they occur, or cannot occur in the first place.

7. Method according to claim 2, wherein for configuration of the orifices of the additional openings, disposed essentially perpendicular to the surface of the membrane, this configuration takes place via displacement of woven fabric of the membrane.

* * * * *